United States Patent [19]

Oishi

[11] Patent Number: 4,739,433
[45] Date of Patent: Apr. 19, 1988

[54] METHOD OF CLEANING MAGNETIC RECORDING DISK OF MAGNETIC RECORDING DISK CARTRIDGE

[75] Inventor: Kengo Oishi, Odawara, Japan

[73] Assignee: Fuji Photo Film Co., Ltd., Japan

[21] Appl. No.: 870,022

[22] Filed: Jun. 3, 1986

[30] Foreign Application Priority Data

Jun. 4, 1985 [JP] Japan ................. 60-120979

[51] Int. Cl.⁴ .................................. G11B 23/03
[52] U.S. Cl. ................................. 360/133
[58] Field of Search ................. 360/133, 137

[56] References Cited

U.S. PATENT DOCUMENTS 4,510,546  4/1985  Asami .................... 360/133
4,620,247 10/1986  Papciak ................. 360/133 X Primary Examiner—A. J. Heniz
Attorney, Agent, or Firm—Pasquale A. Razzano

[57] ABSTRACT

In a magnetic recording disk cartridge, a liner for cleaning the recording surface of the magnetic recording disk is pressed against the recording surface by a lifter under a pressure that increases gradually from the outer edge of the recording surface toward the inner edge of the same.

3 Claims, 2 Drawing Sheets

METHOD OF CLEANING MAGNETIC RECORDING DISK OF MAGNETIC RECORDING DISK CARTRIDGE

BACKGROUND OF THE INVENTION

1. Field of the Invention

This invention relates to a method of cleaning a magnetic recording disk accommodated in a casing to form a magnetic recording disk cartridge.

2. Description of the Prior Art

There has come into wide use as a recording medium for computers floppy disks which are flexible disk of polyester resin or the like having a magnetic layer on each side thereof and on which information is recorded by a magnetic head while the recording disk is rotated.

Recently, there has been put into practice a magnetic recording disk which is smaller than the conventional floppy disks both in thickness and diameter and is generally referred to as a "micro floppy" disk. Generally the micro floppy disk is accommodated in a hard casing to form a cartridge. The micro floppy disk comprises a circular magnetic recording medium which is small in diameter and is thin, and a hub fixed to the center of the recording medium. The hard casing has a hub opening through which the hub is exposed and a magnetic head access opening formed in at least one side wall thereof.

The magnetic recording disk cartridges including the floppy disk and the micro floppy disk are generally provided with a liner on the inner surface of the casing. The liner is formed of an unwoven fabric of rayon or polyester, for example, and is kept in contact with the recording surface of the disk under a light pressure to remove dust on the recording surface while the disk is rotated. The liner has a width at least equal to the width of the recording region of the magnetic recording disk, and is kept pressed against the entire width of the recording surface under a uniform pressure by a lifter which is fixed to the inner surface of the casing at one end and has a resilient arm portion extending obliquely toward the liner to push the liner toward the magnetic recording disk. However, the same amount of information is recorded during one rotation of the disk whether the information is recorded at the outer part or the inner part of the recording region, it follows that as the linear velocity is lower at the inner part than at the outer part, the recording density is higher at the inner part of the recording region than it is at the outer part of the recording region. Therefore, even fine dust particles which may give rise to hardly any problem on the outer part of the recording region can cause drop-out and the like when it deposited on the inner part of the recording region. Accordingly, when the liner is pressed against the recording surface under a uniform pressure that is sufficient for cleaning of the recording surface of the outer part of the recording region, the inner part of the recording region does not receive sufficient cleaning. On the other hand, when the liner is pressed against the recording surface under a higher uniform pressure, the running torque of the recording disk or the torque required to rotate the disk is increased, which is practically undesirable.

SUMMARY OF THE INVENTION

In view of the foregoing observations and description, the primary object of the present invention is to provide a method of cleaning the magnetic recording disk of a magnetic recording disk cartridge with a liner and a lifter which can clean the inner part of the recording region of the disk to a sufficient extent without substantially increasing the running torque of the disk.

The method of the present invention is characterized by the liner being pressed by the lifter against the magnetic recording disk under a pressure that increases gradually from the outer edge of the recording region of the magnetic disk toward the inner edge of the same.

Since the inner part of the liner is pressed against the recording surface under a pressure that is higher than that at the outer part, the cleaning effect of the liner at the inner part is greater than it is at the outer part.

The lifter for pressing the liner in the manner described above can be of various structures. For example, the lifter may be given a shape that changes in the radial direction of the magnetic recording disk. Or, the lifter may be arranged so that the liner is pressed against the disk by a spring the force of which changes in a radial direction.

DESCRIPTION OF THE PREFERRED EMBODIMENTS

Figure 1:
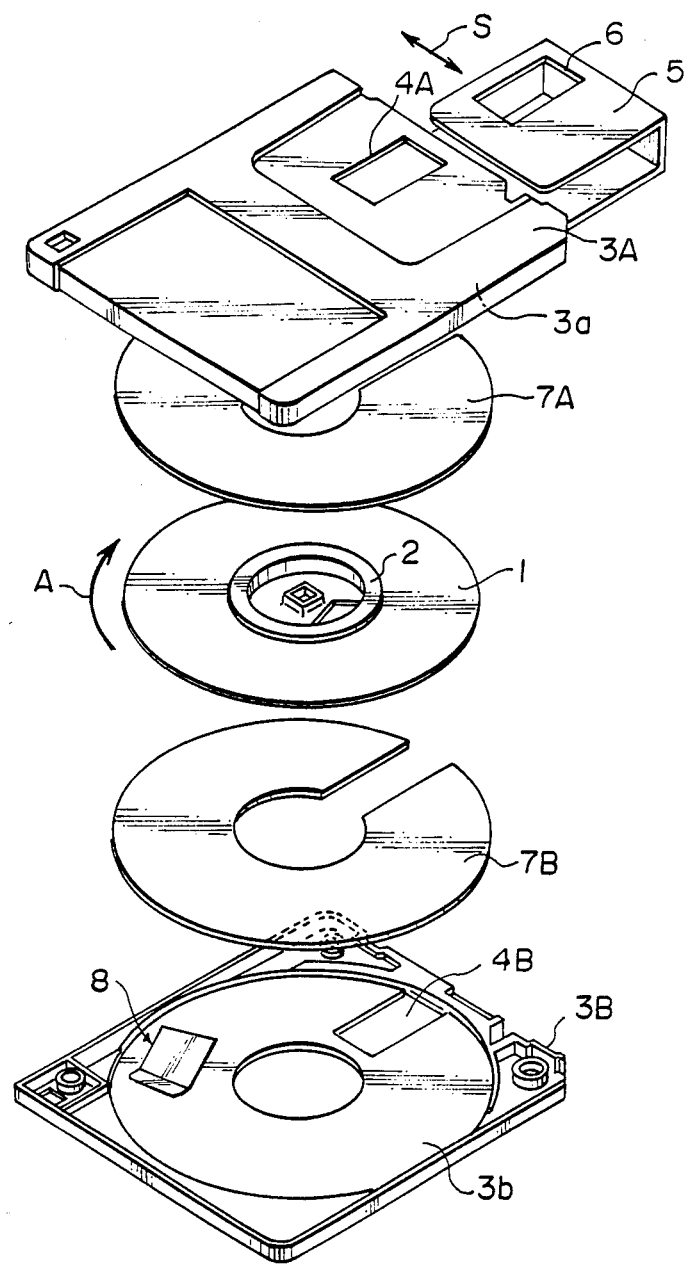
FIG. 1 is an exploded perspective view of a magnetic recording disk cartridge provided with a cleaning device for carrying out the method of the present invention.

In FIG. 1, a magnetic recording disk 1 is accommodated in a cartridge case for rotation about a center core 2 fixed to the center thereof. The cartridge case comprises upper and lower halves 3A and 3B. The upper and lower halves 3A and 3B are respectively provided with magnetic head access openings 4A and 4B which extend in the radial direction of the magnetic recording disk 1 to expose a part of the disk 1 and give a magnetic head (not shown) access to the disk 1. Further, the cartridge case is provided with a shutter 5 which is slidable back and forth in the direction indicated by arrow S to open or close the magnetic head access openings 4A and 4B. The shutter 5 has an opening 6 and when the cartridge 1 is loaded in a recording/reproducing means (not shown), the shutter 5 is moved to a position in which the openings 6 are aligned with the magnetic head access openings 4A and 4B, allowing the access thereto.

The upper and lower halves 3A and 3B are provided with cleaning liners 7A and 7B on the respective inner surfaces 3a and 3b opposite the recording sides of the disk 1. The liners 7A and 7B are of an unwoven fabric of rayon, polyester or the like, and are substantially annular in shape with a diameter substantially equal to that of the disk 1. The liners 7A and 7B are fixed to the inner surfaces 3a and 3b at several points, for example, by heat sealing. Though the liners 7A and 7B are substantially annular in shape in this particular embodiment, the liners 7A and 7B may be of various other shapes provided that they have a width at least equal to the width of the recording region of the disk 1. A lifter 8 for resiliently pressing the liner 7B against the magnetic recording disk 1 is provided between the liner 7B and the inner surface 3b of the lower half 3B.

Figure 2:
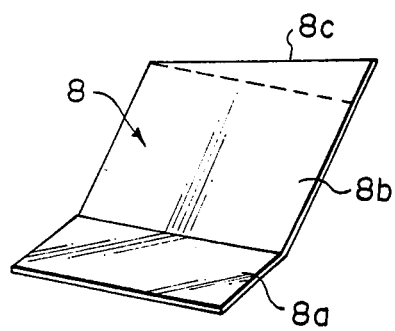
FIG. 2 is a perspective view showing the lifter employed in the cleaning device of FIG. 1.

The lifter 8 is formed of synthetic resin, metal or the like, and comprises a mounting portion 8a by which the lifter 8 is fixed to the inner surface 3b by a suitable fixing means such as double-sided adhesive tape (not shown) and a resilient arm portion 8b extending obliquely from the mounting portion 8a, as shown in FIG. 2. The leading edge 8c of the arm portion 8b is set at an angle to the inner surface 3b, that is, it is not parallel with the inner surface 3b, the height of the arm portion 8b gradually increasing from the outer edge of the disk 1 toward the inner edge thereof. That is, the pressure under which the liner 7B is pressed against the disk 1 by the lifter 8 gradually increases toward the inner edge of the disk 1, whereby the cleaning effect of the liner is greater at the inner part than it is at the outer part. Further, the running torque of the magnetic recording disk 1 is not substantially increased.

If the leading edge 8c of the lifter 8 were parallel to the inner surface 3b as shown by the dotted line in FIG. 2, the pressure under which the liner 7B is pressed against the disk 1 would be substantially uniform, as in a conventional cleaning system. In such a system, when the liner 7B is pressed against the recording disk 1 under a uniform pressure that is sufficient to clean the outer part of the recording region, the inner part of the recording region is insufficiently cleaned. Also, when the liner 7B is pressed against the recording surface under a higher uniform pressure, the running torque of the recording disk is increased.

Figure 3:
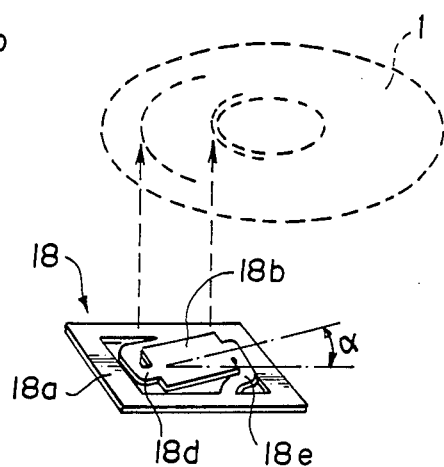
FIG. 3 is a perspective view showing another example of the lifter.

FIG. 3 shows another example of the lifter which can be employed to carry out the method of the present invention.

The lifter 18 shown in FIG. 3 is stamp-formed from a metal sheet or the like, and comprises a central arm portion 18b integrally connected to a rectangular frame-like mounting portion 18a at opposite ends thereof by way of a pair of spring portions 18d and 18e. The central arm portion 18b is set off obliquely from the plane of the mounting portion 18a at an angle α to the plane of the mounting portion 18a. The mounting portion 18a is fixed to the inner surface of the casing so that the central arm portion 18b extends radially to the magnetic recording disk 1 with the higher end of the central arm portion 18b connected to the spring portion 18e being positioned at the inner side.

Figure 4:
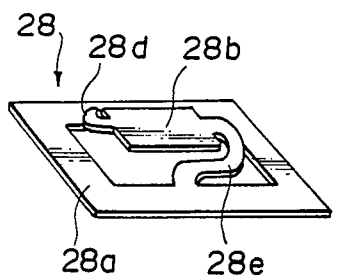
FIG. 4 is a perspective view showing still another example of the lifter.

FIG. 4 shows a lifter 28 in accordance with still another example which is very similar to the lifter 18 shown in FIG. 3, comprising a central arm portion 28b integrally connected to a rectangular frame-like mounting portion 28a at opposite ends thereof by way of a pair of spring portions 28d and 28e. However, in the case of the lifter 28, the central arm portion 28b extends substantially in parallel to the mounting portion 28a and the spring portion 28e positioned inwardly is thicker and wider than the other spring portion 28d so that the pressure under which the liner 7B is pressed against the disk 1 is higher at the inner part of the recording region than at the outer part thereof.

Figure 5:
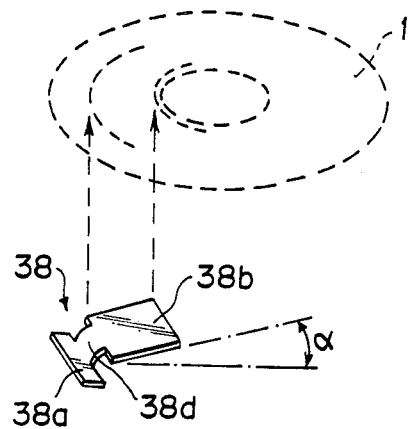
FIG. 5 is a perspective view showing still another example of the lifter.

FIG. 5 shows a lifter 38 in accordance with still another example. Lifter 38 is a cantilever type and comprises a resilient arm portion 38b connected to a mounting portion 38a by way of a support portion 38d and extending obliquely upward from the mounting portion 38a. The mounting portion 38a is fixed to the inner surface 3b of the lower half 3B so that the arm portion 38b extends inwardly radially to the disk 1.

Though several examples of the lifter which can be employed for carrying out the method of the present invention have been described, various other lifters may be employed so long as each such lifter can press the liner against the recording surface of the disk under a pressure that increases from the outer edge of the recording region toward the inner edge thereof. Further, though in the magnetic recording disk cartridge shown in FIG. 1 only a single lifter is provided, a pair of lifters may be provided to press the liners on opposite sides of the magnetic recording disk. In the case of a magnetic recording disk having a recording layer on only one side, such as in magnetic recording disk cartridges for use in an electronic camera, the liner and the lifter may be provided just on the recording side.

What is claimed is:

1. A method for cleaning a magnetic recording disk accommodated in a casing for rotation to form a magnetic recording disk cartridge comprising the steps of placing a cleaning liner in radial contact with the recording region of the magnetic recording disk, pressing the cleaning liner against the recording region by a lifter comprising a mounting portion fixed to the inner surface of the casing and an arm portion extending up from the mounting portion toward the magnetic recording disk to urge the liner against the recording region of the magnetic recording disk and pressing the liner against the recording region of the magnetic recording disk with the lifter under a pressure which increases from the outer edge of the recording region toward the inner edge thereof.

2. A method as defined in claim 1 in which the surface of the lifter in contact with the liner is inclined so as to obliquely extend upward from the outer edge of the recording region toward the inner edge thereof.

3. A method as defined in claim 1 in which said lifter has a horizontal surface which contacts the liner and which is supported by a pair of resilient portions spaced from each other in a radial direction of the magnetic recording disk, with the inwardly positioned resilient portion having a higher resiliency than the other resilient portion.

* * * * *